(12) United States Patent
Kratzer

(10) Patent No.: US 9,802,595 B2
(45) Date of Patent: Oct. 31, 2017

(54) PUMP HOUSING ARRANGEMENT OF A HYDRAULIC ASSEMBLY OF A VEHICLE BRAKE SYSTEM

(71) Applicant: Robert Bosch GmbH, Stuttgart (DE)

(72) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/693,231

(22) Filed: Apr. 22, 2015

(65) Prior Publication Data

US 2015/0298674 A1    Oct. 22, 2015

(30) Foreign Application Priority Data

Apr. 22, 2014  (DE) .................. 10 2014 207 549

(51) Int. Cl.
| | |
|---|---|
| *B60T 13/16* | (2006.01) |
| *B60T 17/02* | (2006.01) |
| *B60T 7/04* | (2006.01) |
| *B60T 13/14* | (2006.01) |
| *B60T 13/66* | (2006.01) |
| *B60T 13/68* | (2006.01) |
| *B60T 8/36* | (2006.01) |

(52) U.S. Cl.
CPC .............. *B60T 17/02* (2013.01); *B60T 7/042* (2013.01); *B60T 8/368* (2013.01); *B60T 13/146* (2013.01); *B60T 13/662* (2013.01); *B60T 13/686* (2013.01)

(58) Field of Classification Search
CPC ...... B60T 8/4031; B60T 8/3675; B60T 8/368; B60T 8/3685
See application file for complete search history.

(56) References Cited

U.S. PATENT DOCUMENTS

| | | | | |
|---|---|---|---|---|
| 5,012,647 A | * | 5/1991 | Maggioni | B60T 13/148 60/413 |
| 5,607,207 A | * | 3/1997 | Nagashima | B60T 8/368 188/356 |
| 6,042,200 A | * | 3/2000 | Hosoya | B60T 8/368 303/113.1 |
| 2010/0032597 A1 | * | 2/2010 | Beer | B60T 8/368 251/129.01 |
| 2013/0207452 A1 | * | 8/2013 | Gilles | B60T 8/4018 303/9.75 |
| 2014/0346852 A1 | * | 11/2014 | Thrasher | B60T 8/4081 303/10 |
| 2015/0035353 A1 | * | 2/2015 | Drumm | B60T 8/3655 303/15 |
| 2015/0061854 A1 | * | 3/2015 | Drumm | B60T 7/042 340/453 |

(Continued)

FOREIGN PATENT DOCUMENTS

| | | | | |
|---|---|---|---|---|
| DE | 102012222897 A1 | * | 8/2013 | ........... B60T 8/3655 |
| EP | 0266938 | * | 5/1988 | ........... B60T 11/16 |
| WO | 2014/045791 A1 | | 3/2014 | |

*Primary Examiner* — Nicholas J Lane

(74) *Attorney, Agent, or Firm* — Maginot, Moore & Beck LLP

(57) ABSTRACT

A pump housing arrangement of a hydraulic assembly for a vehicle brake system includes a pump housing. At least one pump is arranged in the pump housing, and is configured to pump brake fluid for the vehicle brake system. A master brake cylinder for the vehicle brake system is also arranged in the pump housing.

5 Claims, 10 Drawing Sheets

(56) References Cited

U.S. PATENT DOCUMENTS

2015/0158474 A1* 6/2015 Matsunaga ............. B60T 11/16
    60/545
2015/0166030 A1* 6/2015 Kobayashi ............. B60T 13/58
    303/14

* cited by examiner

PUMP HOUSING ARRANGEMENT OF A HYDRAULIC ASSEMBLY OF A VEHICLE BRAKE SYSTEM

This application claims priority under 35 U.S.C. §119 to patent application no. DE 10 2014 207 549.1, filed on Apr. 22, 2014 in Germany, the disclosure of which is incorporated herein by reference in its entirety.

BACKGROUND

The disclosure relates to a pump housing arrangement of a hydraulic assembly of a vehicle brake system, having a pump housing in which there is arranged at least one pump for pumping brake fluid of the vehicle brake system. The disclosure also relates to the use of a pump housing arrangement of said type in a hydraulic assembly of a vehicle brake system. Similar pump housing arrangements are known for example from WO 2014/045791 A1.

Vehicle brake systems of the generic type are used for reducing the speed of a motor vehicle, in particular of a passenger motor vehicle or heavy goods vehicle. For this purpose, hydraulic assemblies are installed in vehicle brake systems, by means of which hydraulic assemblies the functions of an anti-lock system (ABS), of anti-slip regulation (ASR) and/or of an electronic stability program (ESP) can be implemented. For such functions, it must be possible for a brake pressure or brake fluid pressure of a brake fluid that is conducted in associated brake circuits to be regulable, which can be realized by means of the known hydraulic assemblies.

In order that the brake pressure to be regulated can be generated in the hydraulic assembly in the first place, a brake pedal that can be actuated by a driver is provided, said brake pedal being coupled to a master brake cylinder which is connected to the hydraulic assembly. When the brake pedal is actuated, brake fluid is conducted from a storage tank to the master brake cylinder, which then makes the brake fluid available under pressure at the hydraulic assembly, and through the latter, at associated wheel brake cylinders.

For metering the brake fluid and thus for regulating the brake pressure, the hydraulic assembly comprises at least one pump which is driven by a drive motor and which has multiple pump pistons or pump elements which, together with the master brake cylinder, act as brake pressure generators. Furthermore, for the metering of the brake fluid, a multiplicity of valves is provided in the hydraulic assembly, which valves are normally electromagnetically controlled. In accordance with the control, different brake pressures can be made available at the individual wheel brake cylinders.

A conventional hydraulic assembly has a substantially cuboidal or block-like pump housing which is equipped with bores. The bores serve for the arrangement of conduits and functional elements such as the at least one pump and the multiplicity of valves. Furthermore, on the pump housing, ports are formed which hydraulically connect said functional elements and conduits to the master brake cylinder and to the wheel brake cylinders. Both the wheel brake cylinders and the master brake cylinder are arranged outside the pump housing.

SUMMARY

According to the disclosure, a pump housing arrangement of a hydraulic assembly of a vehicle brake system is provided, having a pump housing in which there is arranged at least one pump for pumping brake fluid of the vehicle brake system. In this case, a master brake cylinder of the vehicle brake system is also accommodated in the pump housing.

Thus, according to the disclosure, the master brake cylinder is combined with the at least one pump in a pump housing in a so-called "one-box design". Combined in this way, a significantly more compact, structural space-saving and material-saving pump housing arrangement in relation to known arrangements is created. Specifically, in said known arrangements, the master brake cylinder is arranged outside the pump housing, and is connected to associated conduits in the pump housing by means of generally two pipe conduits via two master brake cylinder pressure ports. By contrast, in the pump housing arrangement according to the disclosure, no external pipe conduits, that is to say pipe conduits mounted outside the pump housing, are required for connecting the master brake cylinder to the pump housing. Furthermore, master brake cylinder pressure ports on the pump housing are dispensed with, whereby more space is available for additional ports. By means of the additional ports, it is possible in particular to realize additional functions for further brake pressure regulation or brake pressure modulation.

When the brake pedal is actuated, this causes the generation of the brake pressure by means of the master brake cylinder, such that the master brake cylinder can be referred to as brake pressure actuator. By means of the at least one pump, in conjunction with a multiplicity of valves, the brake pressure that is generated can be increased or reduced, that is to say adapted or modulated. Thus, in only one pump housing, the solution according to the disclosure performs both functions of a modern vehicle brake system: both the function of brake pressure actuation and the function of brake pressure modulation.

For this purpose, the pump housing is preferably a block-like housing which is particularly preferably formed from a machined extruded profile. The extruded profile is in this case formed in particular from aluminum. Then, to accommodate the master brake cylinder, a correspondingly designed opening, in particular bore, is provided in the block-like housing or hydraulic block. Adjacent to this, there is advantageously also situated in the pump housing a housing opening through which a piston rod, which can be driven by the brake pedal, projects into the master brake cylinder so as to be displaceable back and forth.

Furthermore, according to the disclosure, at least one port for the coupling of an expansion tank to the pump housing is preferably provided on the pump housing such that the expansion tank is connected in brake fluid-conducting fashion to the master brake cylinder. The expansion tank, as a storage tank, stores brake fluid and makes this available to the master brake cylinder via the at least one port. If required, the brake fluid can also be released again from the master brake cylinder into the expansion tank, which offers additional possible variants for making the brake fluid available.

In this case, the expansion tank is preferably arranged directly on the pump housing. In this way, a particularly compact pump housing arrangement is created which requires no external pipe conduits. External pipe conduits not only require more space but are also considerably more susceptible to faults by comparison to the situation if the expansion tank were mounted directly on the pump housing in compact fashion.

Furthermore, it is advantageously the case according to the disclosure that at least one additional port for the coupling of an expansion tank to the pump housing is provided on the pump housing such that the expansion tank is connected in brake fluid-conducting fashion to at least one brake conduit section, already mentioned above, which is accommodated in the pump housing. Connected in this way, the expansion tank is, by way of the at least one additional port, coupled in particular directly to the at least one brake conduit section. Such coupling yields additional possibilities with regard to the modulation of the brake pressure. For example, in this way, it is possible for brake fluid to be drawn directly out of the expansion tank into the at least one brake conduit section and returned again if required. In this way, it is for example possible for an ESP control facility to be improved yet further in relation to conventional systems.

It is preferably the case that both the at least one port and also the at least one additional port for the coupling of the expansion tank to the pump housing lie in a plane. In this way, it is possible in particular for the expansion tank to be of cuboidal design, in a particularly simple manner from a manufacturing aspect, and in this case, said expansion tank lies by way of one of its planar side surfaces in space-saving fashion against the at least one port and at least one additional port which lie in a plane.

Furthermore, according to the disclosure, a fastening element for the positionally fixed fastening of the pump housing to an associated vehicle is advantageously arranged on the pump housing, which fastening element simultaneously serves to fasten the master brake cylinder in the pump housing. In this way, a pump housing arrangement is created which can be fastened to the vehicle without further functional components. The one fastening element simultaneously performs two fastening functions, such that components and assembly time are saved. Furthermore, the pump housing may, as before, be produced inexpensively as an extruded profile, because the fastening element is preferably intended for being attached only afterwards to the pump housing.

The fastening element is advantageously of plate-like form, such that it can bear areally against the pump housing in a particularly effective manner. In this case, contact forces that arise can be transmitted between the vehicle, fastening element and pump housing arrangement in a widely distributed manner over the entire plate-like surface, which preserves the components involved.

In particular, for this purpose, the fastening element has at least two fastening holes, in each of which there is guided an associated screw, wherein at least one screw fastens the fastening element to the pump housing, and the fastening element can be fastened to the vehicle by means of at least one further screw. In this way, the pump housing arrangement according to the disclosure can, as a whole, be screwed in non-positively locking fashion to the vehicle in a particularly simple manner in one step.

A particularly stable non-positively locking connection with particularly uniform force distribution between the pump housing arrangement and the vehicle is created if, in an advantageous manner, in each case two of four fastening holes are arranged diametrically oppositely in the fastening element. Through in each case two diametrically oppositely situated fastening holes there is guided in each case one screw, by means of which the fastening element is attached to the pump housing. Then, screws are also to be guided through the two other diametrically oppositely situated fastening holes, by means of which screws the fastening element and thus the pump housing arrangement as a whole can be fastened to the vehicle.

Furthermore, the fastening element is preferably designed with a piston rod opening for the leadthrough of a piston rod (already mentioned above), which is coupled to a brake pedal, into the master brake cylinder. Designed in this way, the pump housing arrangement can be attached by means of the fastening element to the vehicle at precisely the level of the master brake cylinder, because the associated piston rod is guided through the fastening element. The piston rod is furthermore coupled to the brake pedal, which is situated in the vehicle interior compartment and which can be actuated there by the driver of the vehicle. When the brake pedal is actuated, mechanical forces are transmitted to the piston rod, which mechanical forces act, in the master brake cylinder, on the brake fluid present therein. The mechanical forces of their type also exert load on the fastening element. With the solution according to the disclosure, it was identified that such load is particularly low in the case of the piston rod being guided through the fastening element. Here, it is most advantageous for the piston rod opening to be positioned at least approximately centrally in the fastening element.

Furthermore, it is preferable for at least one recess to be provided on the pump housing such that the fastening element for fastening the pump housing to the associated vehicle is accessible via the at least one recess. In this way, it is possible for the pump housing arrangement to be preassembled and then fastened to the vehicle when already in the assembled state, which saves working time. In particular, for this purpose, the at least one recess on the pump housing runs in continuous fashion from one side of the pump housing in the direction of the fastening element. The at least one recess is preferably in the form of a groove and/or a step in an outer contour of the pump housing.

According to the disclosure, the pump housing advantageously also has a first housing section and an adjacent second housing section, wherein the at least one pump is accommodated in the first housing section and the master brake cylinder is accommodated in the second housing section, and the first housing section has a smaller thickness than the second housing section. Thus, the second housing section has a greater thickness than the first housing section. In this way, the pump housing is formed such that the master brake cylinder can be accommodated in the pump housing, in addition to the conventional conduits and functional elements, in the second housing section. Furthermore, a greater thickness of the second housing section creates additional space for further ports in and on the pump housing, but at the same time, with the first housing section of relatively small thickness, structural space in an associated vehicle is taken up only to the extent that is absolutely necessary.

In particular, in this case, the expansion tank is advantageously arranged on the second housing section, which expansion tank is then connected to the master brake cylinder via particularly short conduits in the pump housing. In this way, the brake fluid can be made available to the master brake cylinder from the expansion tank, and if necessary also in the reverse direction, virtually without a time delay.

Furthermore, according to the disclosure, a drive motor for driving the at least one pump is preferably arranged on the first housing section. Arranged in this way, the drive motor is situated on precisely that housing section in which the at least one pump is also accommodated. The individual pump can thus be driven by the drive motor without great transmission losses, in particular by means of a drive shaft, with particularly high efficiency. Furthermore, during drive operation, force is introduced from the drive motor primarily into the first housing section. In this way, an introduction of force into the master brake cylinder in the second housing section, such as is generated during the actuation of the brake pedal, is virtually unaffected. The forces introduced in this way can thus each be processed further with high efficiency. Furthermore, the drive motor on the first housing section is arranged in particularly compact fashion on the pump housing, because the first housing section is less thick than the second housing section. Such an arrangement saves required structural space in the associated vehicle.

Furthermore, at least one brake conduit section in which at least one valve is arranged is advantageously also accommodated in the first housing section. The at least one valve is a constituent of a multiplicity of valves by means of which the brake pressure can be regulated, in particular in conjunction with the at least one pump. In this way, the brake pressure modulation is concentrated in the first housing section. Concentrated in this way, brake pressure losses that would otherwise occur, in particular owing to friction of the brake fluid against relatively long conduit sections that would otherwise be required, are eliminated.

Furthermore, the fastening element is advantageously attached to the second housing section, in which the master brake cylinder is preferably also accommodated. When fastened to the vehicle, the pump housing is furthermore particularly preferably positioned such that the second housing section lies above the first housing section. In this way, the second housing section also in particular lies above the drive motor that is preferably arranged on the first housing section, which drive motor makes up a relatively high fraction of the total mass of the hydraulic assembly. It has been found that, in this way, during operation, force generated by the drive motor is transmitted to the pump housing in a particularly favorable manner.

Furthermore, the disclosure is also directed to the use of a pump housing arrangement of said type in a hydraulic assembly of a vehicle brake system. This permits a particularly compact arrangement of the master brake cylinder, as brake pressure actuator, and of the pump with the associated valves, as brake pressure modulator, in the vehicle brake system. Such a compact arrangement saves structural space and is less susceptible to faults than in known vehicle brake systems. Furthermore, with such use of the pump housing arrangement according to the disclosure, the brake pressure is additionally modulated or adapted via the at least one additional port. New functions for innovative ABS and ESP systems in vehicle brake systems are thus made possible. Furthermore, prerequisites for recovery of braking energy are fulfilled.

BRIEF DESCRIPTION OF THE DRAWINGS

An exemplary embodiment of the solution according to the disclosure will be explained in more detail below with reference to the appended schematic drawings, in which.

DETAILED DESCRIPTION

Figure 1:
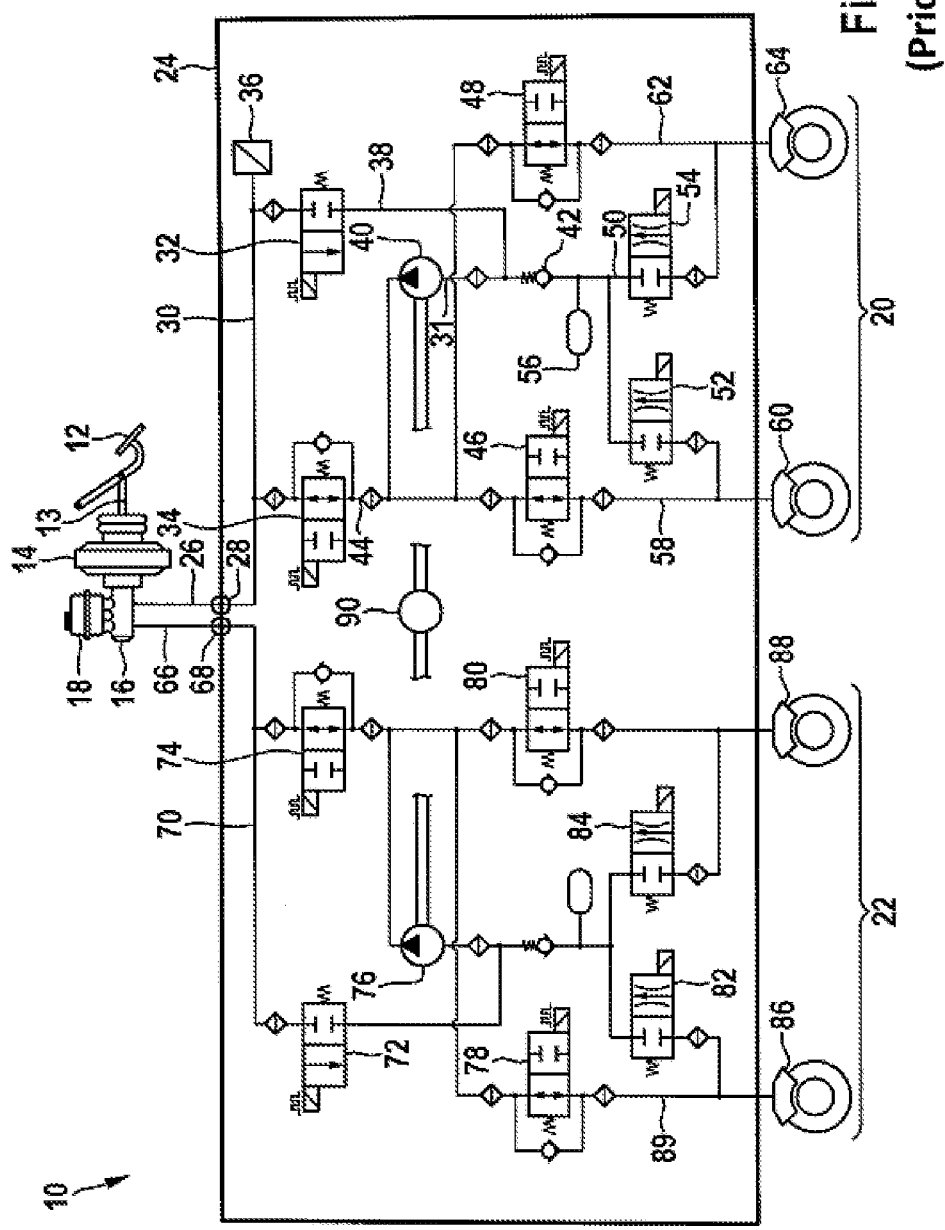
FIG. 1 shows a circuit diagram of a hydraulic vehicle brake system according to the prior art.

FIG. 1 illustrates a hydraulic vehicle brake system 10 which comprises a brake pedal 12 which can be actuated by a driver of an associated four-wheeled vehicle (not illustrated). The brake pedal 12 acts via a piston rod 13 on a brake servo 14 by means of which, at a master brake cylinder 16, pressure can be exerted on a brake fluid, in the present case on a brake liquid. For this purpose, an expansion tank 18 for compensatory storage of brake fluid is coupled to the master brake cylinder 16. Furthermore, two brake circuits 20 and 22 are connected to the master brake cylinder 16, which brake circuits are arranged substantially in a common pump housing 24, and in which brake circuits the brake fluid is conducted.

In the brake circuit 20, a conduit pipe 26 leads from the master brake cylinder 16, as brake pressure generator or brake pressure actuator, to the pump housing 24 and then via a master brake cylinder pressure port 28 to a conduit 30 arranged in the pump housing 24. The pipe conduit 26 is thus an external pipe conduit 26 in relation to the pump housing 24, and the conduit 30 is an internal conduit 30. The internal conduit 30 leads to a high-pressure switching valve 32 and a switchover valve 34. A pressure sensor 36 is also connected to the conduit 30. A conduit 38 leads from the high-pressure switching valve 32 to the suction side of a pump 40, which likewise acts as brake pressure generator, and to a check valve 42. A conduit 44 leads from the switchover valve 34 to the pressure side of the pump 40 and to a first inlet valve 46 and a second inlet valve 48. A conduit 50 leads from the check valve 42 to a first outlet valve 52 and a second outlet valve 54. An accumulator 56 is also connected to the conduit 50. A conduit 58 leads from the first inlet valve 46 to a first wheel brake cylinder 60 and to the first outlet valve 52. A conduit 62 leads from the second inlet valve 48 to a second wheel brake cylinder 64 and to the second outlet valve 54.

Illustrated on the left-hand side of FIG. 1 is the brake circuit 22, which is of substantially structurally identical design to the brake circuit 20. In this case, an external pipe conduit 66 leads from the master brake cylinder 16 via a master brake cylinder pressure port 68 to an internal conduit 70 in the pump housing 24. There, the brake circuit 22 has, as essential functional components, a high-pressure switching valve 72, a switchover valve 74, a pump 76, a first inlet valve 78, a second inlet valve 80, a first outlet valve 82, a second outlet valve 84, and associated wheel brake cylinders 86 and 88. In this case, a conduit 89 leads from the first inlet valve 78 to the first wheel brake cylinder 86.

Both pumps 40 and 76 can be driven by means of one drive motor 90, which is arranged on the pump housing 24.

Figure 2:
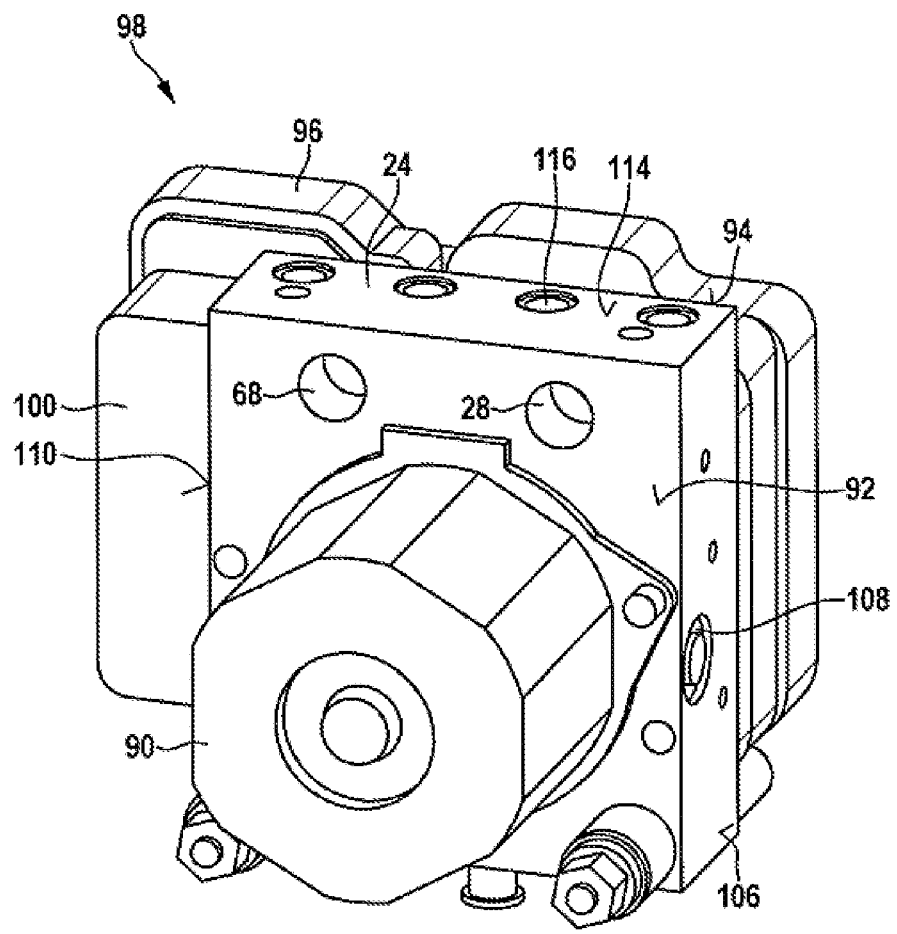
FIG. 2 shows a perspective view of a hydraulic assembly according to the prior art.

FIG. 2 illustrates such an arrangement of the drive motor 90 slightly below the center of a side surface 92 on the pump housing 24. Opposite the side surface 92 on a side surface 94, a control unit 96 in the form of an electronic control unit (ECU) is arranged on the pump housing 24. The pump housing 24 with its functional elements (valves and pumps) accommodated therein, the drive motor 90 and the control unit 96 form a so-called hydraulic assembly 98 by means of which the brake pressure generated by the master brake cylinder 16 can be adapted.

For this purpose, the control unit 96 comprises multiple internal magnet coils (not illustrated) for controlling the described valves 32, 34, 46, 48, 52, 54, 72, 74, 78, 80, 82 and 84, which are all electromagnetic valves. Furthermore, the control unit 96 has a plug connector 100 by means of which the control unit 96 can be supplied with electrical current. The control unit 96 controls and regulates all of said valves 32, 34, 46, 48, 52, 54, 72, 74, 78, 80, 82 and 84, which can thereby be opened and/or closed as required. Furthermore, the control unit 96 regulates the drive motor 90 and thus also the operation of the pumps 40 and 76. The brake pressure in the brake fluid can be adapted in this way. Such adaptation is required in particular in ABS, ASR and ESP applications.

Figure 3:
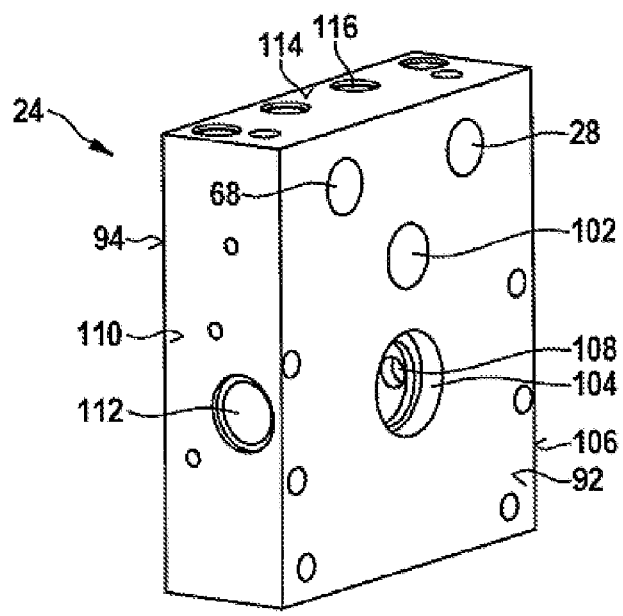
FIG. 3 shows a perspective view of a pump housing according to the prior art.
Figure 4:
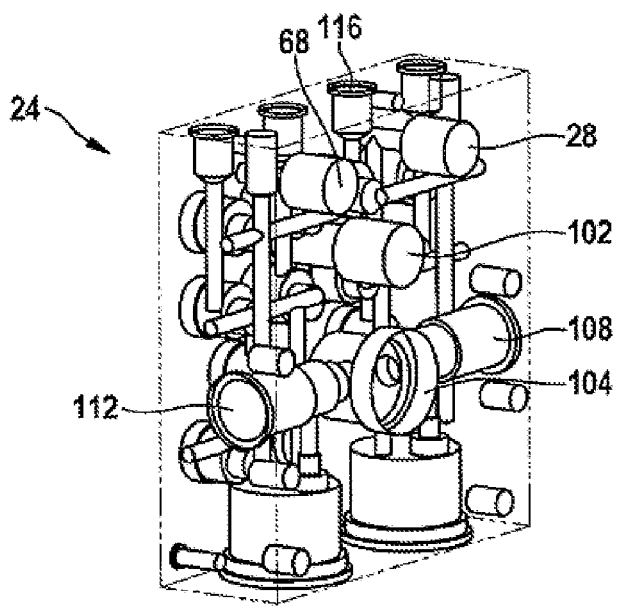
FIG. 4 shows the view as per FIG. 3 without housing exterior surfaces.

FIG. 3 and FIG. 4 show the pump housing 24, which is in the form of a block-like housing or hydraulic block composed of an aluminum extruded profile which is machined after an extrusion process. In this case, the extruded profile has been provided inter alia with various bores. Bores in this case include in particular two bores for the master brake cylinder pressure ports 28 and 68, a bore as a drive motor contact bore 102, and a motor shaft bore 104 for a motor shaft of the drive motor 90 in the side surface 92. Furthermore, a pump bore 108 is provided in a side surface 106 adjoining the side surface 92, and a further pump bore 112 is provided in a side surface 110 situated opposite the side surface 106. The two pump bores 108 and 112 extend in the interior of the pump housing 24 in stepped fashion, with a diameter decreasing in the direction of the motor shaft bore 104, and each serve for receiving a pump element or a pump 40 and 76 respectively.

Furthermore, on a side surface 114 enclosed by the side surfaces 92, 94, 106 and 110, which side surface 114 constitutes the top side surface of the pump housing in FIGS. 2 and 3, four bores are provided as wheel brake cylinder ports 116. The wheel brake cylinders 60, 64, 86 and 88 can be connected to said wheel brake cylinder ports.

FIG. 4 illustrates inter alia the conduits 30, 38, 44, 50, 58, 62, 70 and 89, which are all, as internal conduits, bores in the interior of the pump housing 24, so-called internal bores.

FIG. 5 to FIG. 13 illustrate a hydraulic vehicle brake system 118 with a pump housing arrangement 120, which by contrast to the vehicle brake system 10, has a pump housing 122 in which the master brake cylinder 16 is accommodated. In this case, only those functional components which are relevant for explaining differences are denoted by reference signs which differ from those in the vehicle brake system 10.

Figure 5:
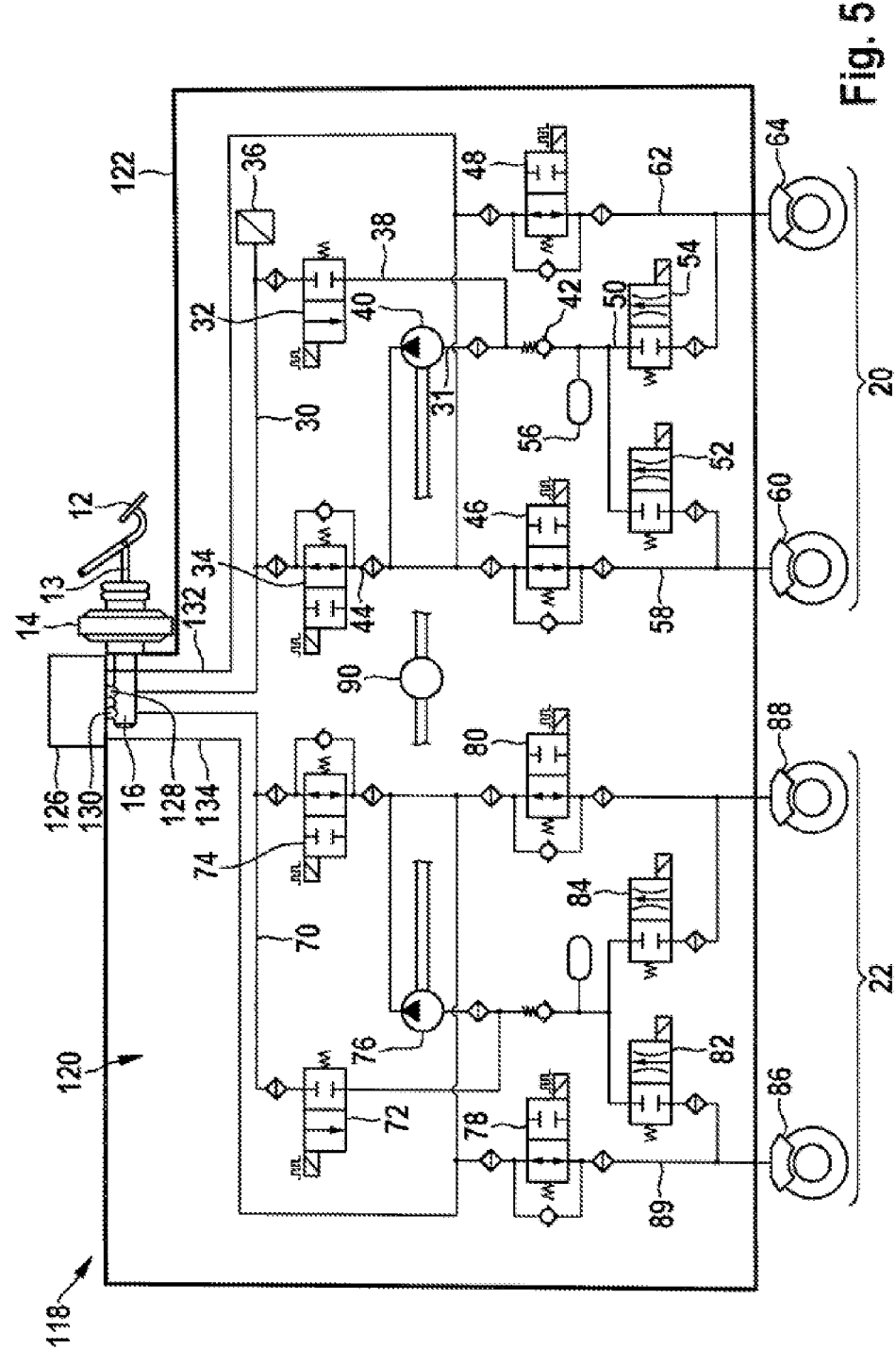
FIG. 5 shows a circuit diagram of a hydraulic vehicle brake system for an exemplary embodiment of a pump housing arrangement according to the disclosure.
Figure 6:
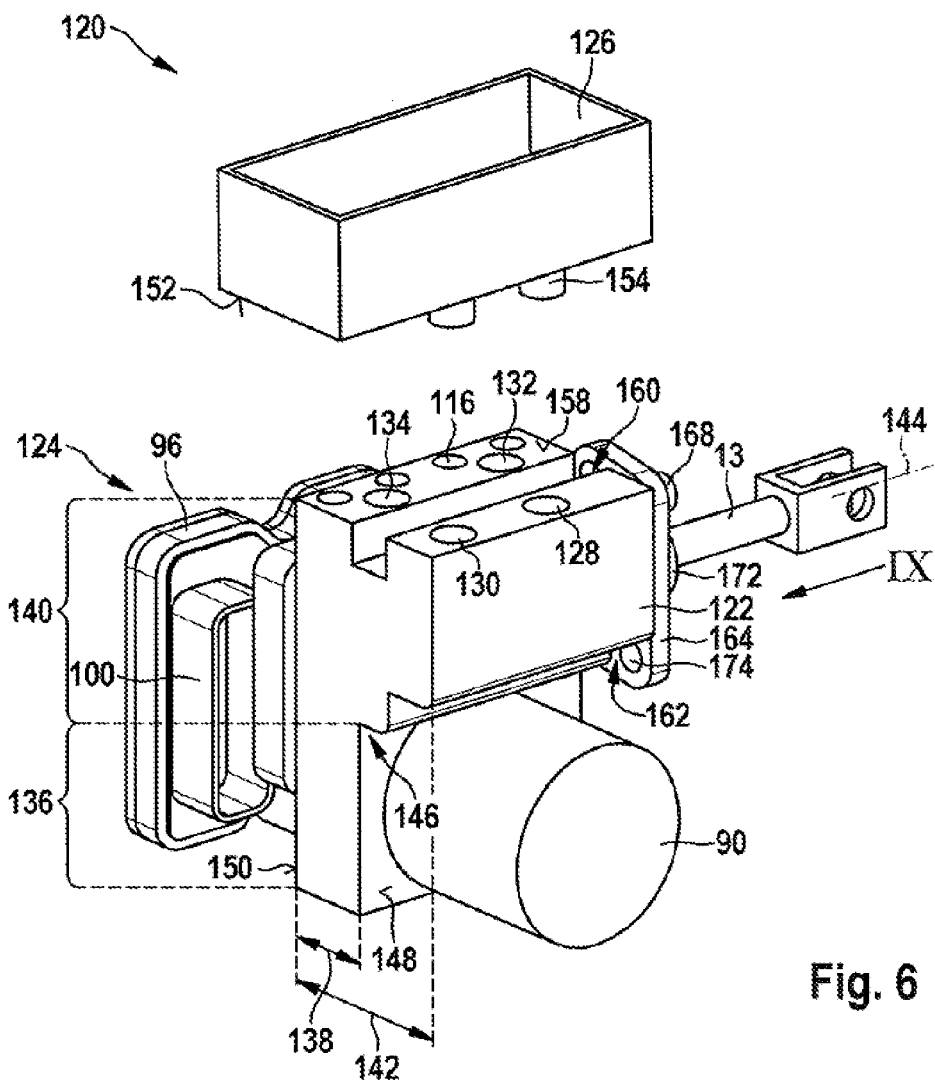
FIG. 6 shows a perspective view of the exemplary embodiment with an expansion tank not yet in a mounted state.
Figure 7:
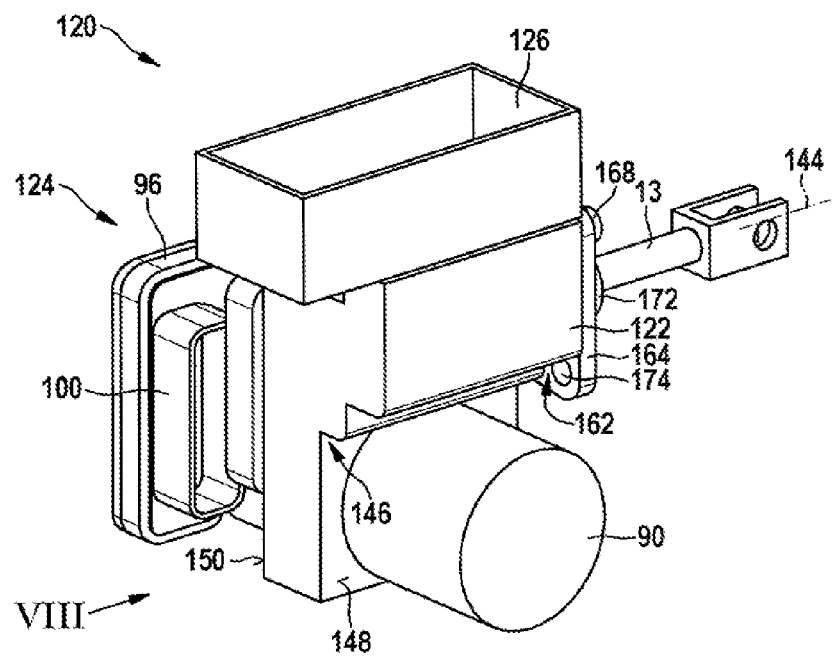
FIG. 7 shows the view as per FIG. 6 with the expansion tank in the mounted state.
Figure 8:
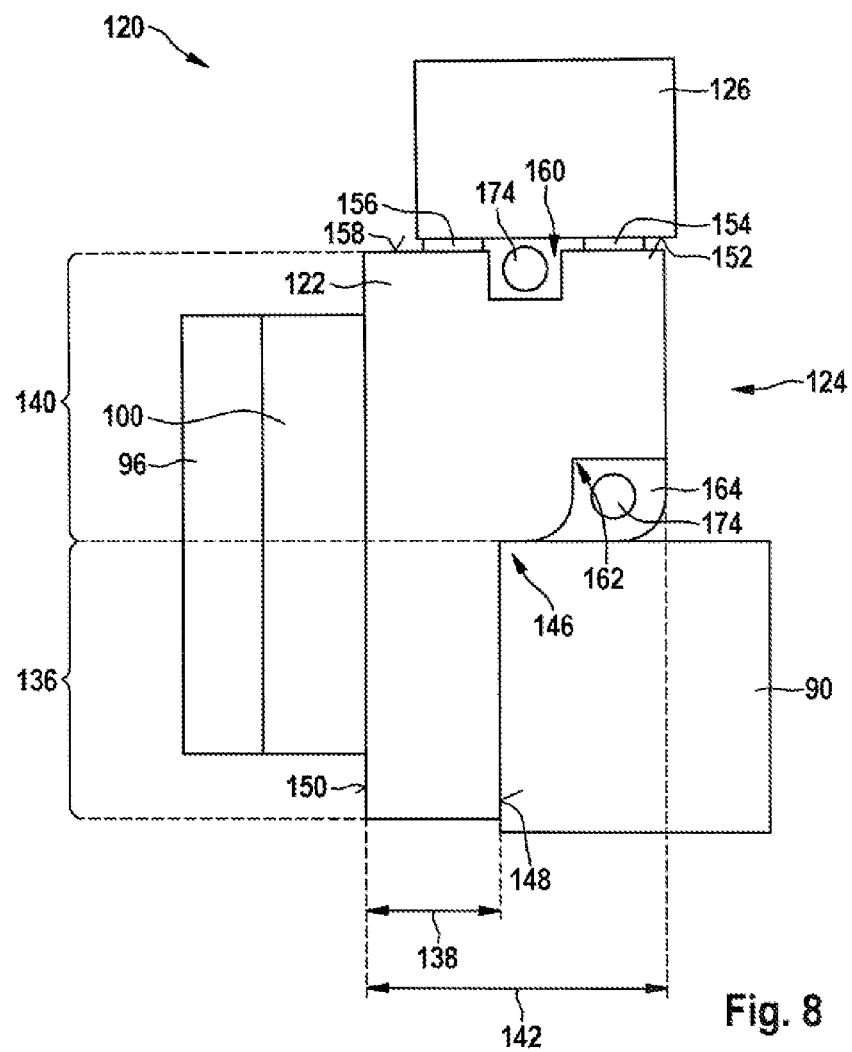
FIG. 8 shows the side view VIII as per FIG. 7.
Figure 9:
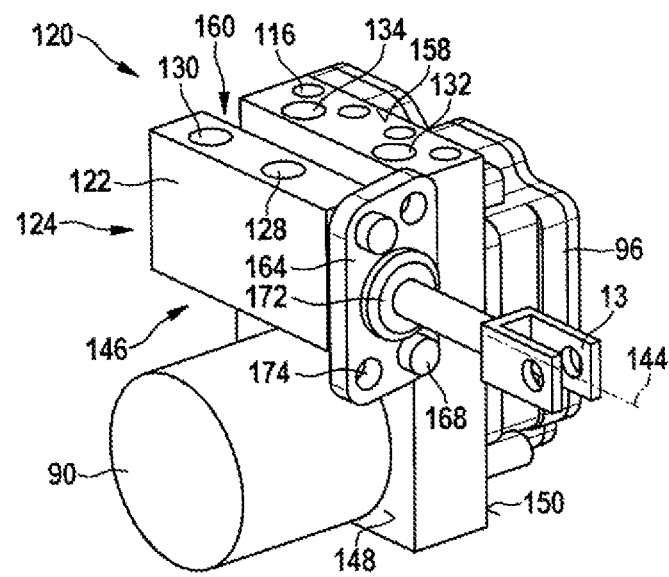
FIG. 9 shows the perspective view IX as per FIG. 6, without the expansion tank.
Figure 10:
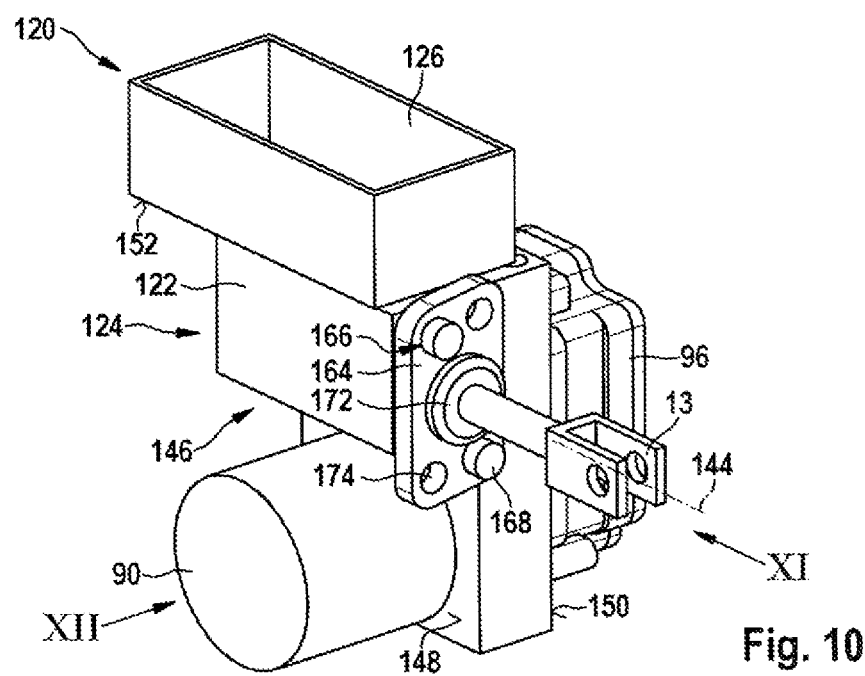
FIG. 10 shows the view as per FIG. 9 with the expansion tank in the mounted state.

FIG. 5 shows that, by means of the pump housing arrangement 120, by contrast to the vehicle brake system 10, there are no external pipe conduits 26 and 66 for connecting the master brake cylinder 16 to the brake circuits 20 and 22. Rather, the master brake cylinder 16 is connected, in the pump housing 122, directly to the internal conduits 30 and 70. With such a master brake cylinder 16 which is integrated in the pump housing 122, a particularly compact and stable pump housing arrangement 120 is created. The master brake cylinder 16 is in this case to be actuated by means of the brake pedal 12 via the brake servo 14. It is alternatively also possible for no brake servo 14 to be provided.

Furthermore, an expansion tank 126 is provided which is connected in brake fluid-conducting fashion via two ports 128 and 130 to the master brake cylinder 16. When the brake pedal 12 is actuated, the brake fluid is drawn from the expansion tank 126, via the ports 128 and 130 as so-called suction ports, into the master brake cylinder 16. From the master brake cylinder 16, the brake fluid is furthermore then forced into the conduits 30 and 70 as an associated brake conduit system.

Furthermore, the expansion tank 126 is additionally connected in brake fluid-conducting fashion via two additional ports 132 and 134 directly to a brake conduit section, in the present case to the conduit 62 and the conduit 89, respectively, in the interior of the pump housing 122. Connected in this way, it is additionally possible for brake fluid to be released, in particular drawn, from the expansion tank 126 into the brake circuits 20 and 22, or returned into the expansion tank 126 again as required. In this way, additional variation and/or modulation of the brake pressure is possible in relation to known vehicle brake systems 10. The two additional ports 132 and 134 thus create a direct and additional connection between the expansion tank 126 and the hydraulic assembly 124 for brake pressure modulation, in the present case with the conduits 62 and 89 as associated brake conduit sections.

As illustrated in FIGS. 6 to 13, the pump housing arrangement 120 comprises the pump housing 122, the drive motor 90 and the control unit 96 as hydraulic assembly 124. Furthermore, the pump housing arrangement 120 comprises the expansion tank 126 and the piston rod 13 which is coupled to the brake pedal 12 and which is guided in the master brake cylinder 16.

The pump housing 122 is formed from an aluminum extruded profile. In addition to bores that have been implemented, the extruded profile has been machined such that the pump housing 122 has a first housing section 136 with a first thickness 138 and a second housing section 140 with a second thickness 142. In this case, the first thickness 138 is smaller than the second thickness 142, both of said thicknesses being measured perpendicular to a longitudinal axis 144 of the master brake cylinder 16. Thus, the pump housing has, transversely to the longitudinal axis 144, a cross section which has a step or a shoulder 146 from the first housing section 136 to the second housing section 140.

The second housing section 140 thus offers more space, at least transversely to the longitudinal axis 144, than the first housing section 136. In this way, the master brake cylinder 16 can be accommodated in the second housing section 140 such that the known conduits and functional elements can be positioned in substantially the same way as in conventional pump housings. Then, the master brake cylinder 16 is arranged at the level of the previous master brake cylinder pressure ports 28 and 68 (see FIGS. 2 to 4).

The two pumps 40 and 76 of the two brake circuits 20 and 22, and at least substantially the associated valves 32, 34, 46, 48, 52, 54, 72, 74, 78, 80, 82 and 84 thereof, are situated in the first housing section 136. Furthermore, on the first housing section 136, the drive motor 90 is mounted on a section side surface 148. In the installed state and with reference to FIGS. 6 to 12, the section side surface 148 is positioned in the lower half of the pump housing 122, whereby the drive motor 90 is arranged at a lower level than in the case of conventional pump housings (see FIGS. 2 to 4). A lower arrangement of this type has a positive effect on the introduction of force from the drive motor 90 into the pump housing 122.

Alternatively, it is also possible for the step 146 to be omitted, such that the pump housing 122 then does not have different thicknesses 138 and 142, and instead has a uniform thickness. In this case, the master brake cylinder 16 may be positioned in the pump housing 122 such that the previous master brake cylinder pressure ports 28 and 68 can serve as ports 128 and 130 for coupling to the expansion tank 126.

The control unit 96, in particular for controlling the drive motor 90 and the valves 32, 34, 46, 48, 52, 54, 72, 74, 78, 80, 82 and 84, is mounted on a side surface 150 which is situated opposite the section side surface 148 on the pump housing 122 and which extends over the first and second housing sections 136 and 140.

Figure 11:
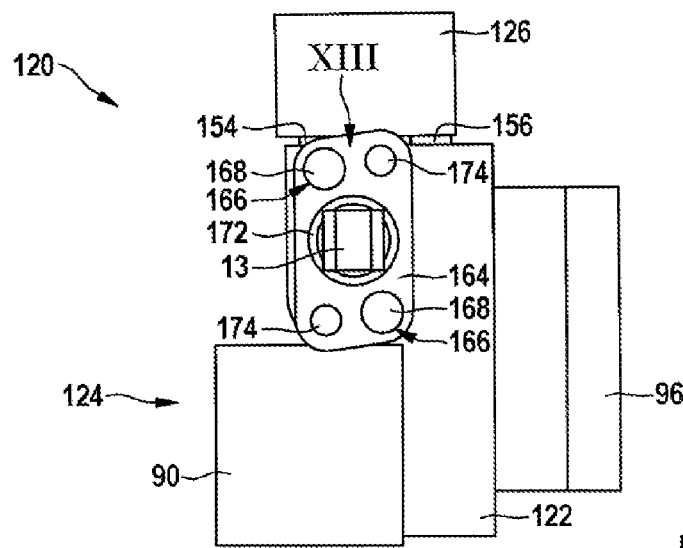
FIG. 11 shows the side view XI as per FIG. 10.
Figure 12:
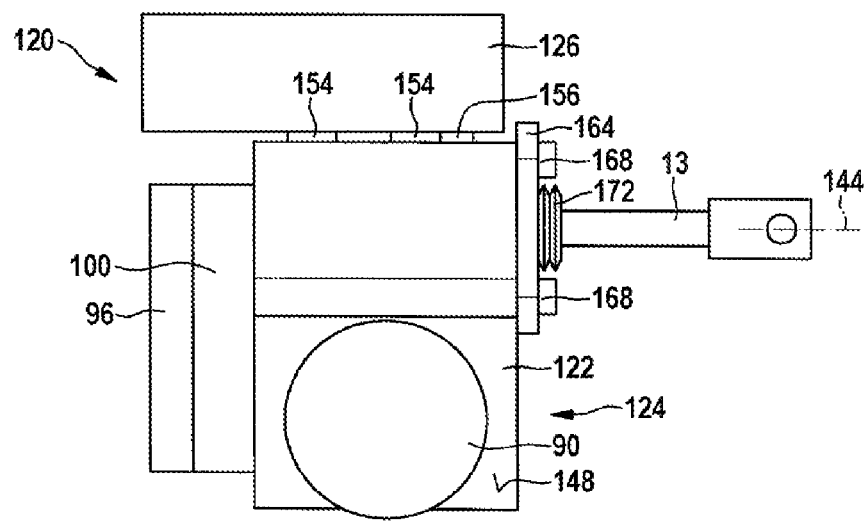
FIG. 12 shows the side view XII as per FIG. 10.
Figure 13:
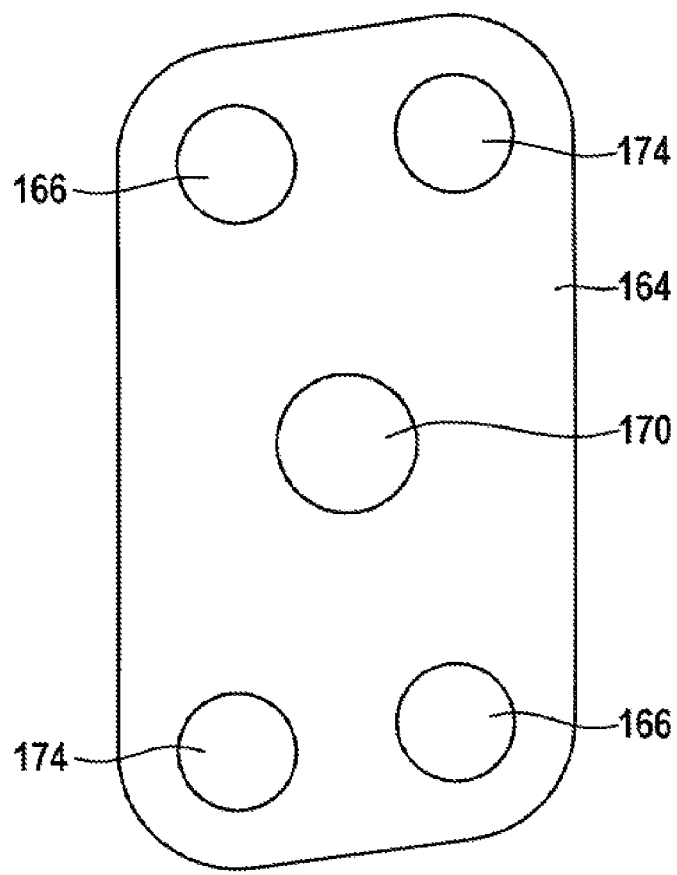
FIG. 13 shows the detail XIII as per FIG. 11.

The expansion tank 126 is only schematically illustrated and is of substantially cuboidal form. The expansion tank 126 has, on its lower tank side 152 as seen in FIGS. 5 to 12, two port connectors 154 which, in the assembled state, are connected to the ports 128 and 130 of the pump housing. In the present case, the two port connectors 154 are plugged into the two ports 128 and 130. Furthermore, two additional port connectors 156 which can be seen in FIGS. 11 and 12 are provided on the lower tank side 152, which additional port connectors connect the expansion tank 126 in brake fluid-conducting fashion to the two additional ports 132 and 134.

Both the two ports 128 and 130 and the two additional ports 132 and 134 lie in a plane on the pump housing 122 at an upper side surface 158 (as seen in FIGS. 6 to 12), which is also the upper side surface of the second housing section 140. The expansion tank 126, at its tank side 152, lies by way of its easily manufacturable cuboidal external contour against such a plane of the side surface 158 in a space-saving and positively locking manner and thus with particularly uniform transmission of force. Furthermore, the four wheel brake cylinder ports 116 are provided on the upper side surface 158.

In an alternative embodiment, the ports 128 and 130 and the additional ports 132 and 134 lie in different planes. Correspondingly designed port connectors of the expansion tank 126 then compensate for a height difference that arises in this case. In a further alternative embodiment, the expansion tank 126 is not mounted directly on the pump housing 122, but is connected to the master brake cylinder 16, from a location further remote, via external conduits as suction conduits. In this case, in a further design variant, the hydraulic assembly 124 may then be additionally supplied with brake fluid from the suction conduits via additional ports.

Furthermore, a recess 160 is provided in the upper side surface 158 between the ports 128 and 130 on one half and the additional ports 132 and 134 on the other half, which recess extends in the second housing section 140 in continuous fashion in the form of a groove parallel to the longitudinal axis 144. Furthermore, a further recess 162 is provided in the second housing section 140, specifically at the step 146 in the form of a further step, which likewise runs in continuous fashion parallel to the longitudinal axis 144.

Furthermore, a plate-like fastening element 164 as a fastening flange with two diametrically oppositely situated fastening holes 166 is arranged on the second housing section 140, through which fastening holes in each case one fastening screw or screw 168 is guided. The fastening element 164 is fastened to the second housing section 140 by means of screws 168 of said type. Furthermore, the fastening element 164 has, in its center, a piston rod opening 170 through which the piston rod 13 is guided. Guided in this way, it is thus the case that not only the fastening element 164 is held by way of the screws 168 on the pump housing 122, but also the master brake cylinder 16. At the piston rod opening 170 there is provided a dust cap as a sealing element 172 which sealingly surrounds the piston rod 13 and thus prevents dust and dirt from ingressing into the master brake cylinder 16 from the outside.

Two further fastening holes 174 are situated diametrically opposite one another on the fastening element 164, which further fastening holes serve for the attachment of the pump housing arrangement 120 as a whole to the associated vehicle. For this purpose, two further screws (not illustrated) can be guided through the fastening holes 174 and screwed to the vehicle, in particular to a vehicle bulkhead. Here, in the case of an otherwise fully installed pump housing arrangement 120, the two recesses 160 and 162 permit free access to the fastening holes 174, with a line of sight to a vehicle internal wall (see in particular FIG. 8). In this way, the pump housing arrangement 120 can be prefabricated to a very great extent in inexpensive fashion before being installed in the vehicle.

In the installed state, by means of the fastening element 164 on the second housing section 140, the pump housing arrangement 120 is fastened at a higher level than that at which the drive motor 90 is fastened to the first housing section 136. It has been found that, during the operation of the drive motor 90 and of the master brake cylinder 16, the forces that are generated here interact with one another to the least possible extent. In this way, particularly favorable introduction of force from the drive motor 90 into the pump housing 122 is realized, with the effect that the fastening element 164 is subjected to only particularly low load, which reduces wear.

What is claimed is:

1. A pump housing arrangement of a hydraulic assembly for a vehicle braking system, comprising:
   a pump housing;
   at least one brake conduit section arranged in the pump housing, the at least one brake conduit section being configured to connect to at least one wheel brake cylinder;
   at least one pump arranged in the pump housing, and configured to pump brake fluid for the vehicle brake system; and
   a master brake cylinder for the vehicle brake system, which is arranged in the pump housing,
   wherein the pump housing defines at least one port that leads directly to the master cylinder and that is configured to connect the pump housing to an expansion tank such that the expansion tank is connected in a brake fluid-connecting fashion directly to the master brake cylinder,
   wherein the pump housing defines at least one additional port that is fluidly connected directly to the at least one brake conduit section, the at least one additional port being configured to connect the pump housing directly to the expansion tank such that the expansion tank is connected in a brake fluid-connecting fashion to the at least one brake conduit section via the at least one additional port,
   wherein the at least one additional port is spaced apart from the at least one port, and
   further comprising:
   a fastening element that is arranged on the pump housing and configured to positionally fixedly fasten the pump housing to the associated vehicle and to fasten the master brake cylinder within the pump housing; and
   at least two screws,
   wherein:
   the fastening element comprises a flat plate having at least two fastening holes configured to guide the at least two screws; and the at least two screws are received in the at least two fastening holes such that one screw fastens the fastening element to a front face of the pump housing, and another screw is configured to fasten the fastening element to the associated vehicle.

2. The pump housing arrangement according to claim 1, wherein the fastening element defines a piston rod opening configured to enable a leadthrough of a piston rod coupled to a brake pedal to pass therethrough and into the master brake cylinder.

3. The pump housing arrangement according to claim 1, wherein the pump housing defines at least one recess that enables access to the fastening element for fastening the pump housing to the associated vehicle.

4. The pump housing arrangement according to claim 1, the pump housing further including:
   a first housing section; and
   a second housing section positioned adjacent to the first housing section;
   wherein:
   the at least one pump is arranged in the first housing section;
   the master brake cylinder is arranged in the second housing section; and
   the first housing section has a thickness that is smaller than a thickness of the second housing section.

5. The pump housing arrangement according to claim 4, further comprising a drive motor that is arranged in the first housing section, and that is configured to drive the at least one pump.

* * * * *